(12) United States Patent
Heber et al.

(10) Patent No.: US 7,566,988 B2
(45) Date of Patent: Jul. 28, 2009

(54) METHOD AND APPARATUS FOR MONITORING UPS POWER SOURCES

(75) Inventors: Brian Heber, Delaware, OH (US); Terry D Bush, Westerville, OH (US); Mohammad Nanda Marwali, Lewis Center, OH (US); Paul Taylor, Delaware, OH (US)

(73) Assignee: Liebert Corporation, Columbus, OH (US)

( * ) Notice: Subject to any disclaimer, the term of this patent is extended or adjusted under 35 U.S.C. 154(b) by 374 days.

(21) Appl. No.: 11/423,497

(22) Filed: Jun. 12, 2006

(65) Prior Publication Data

US 2006/0290205 A1  Dec. 28, 2006

Related U.S. Application Data

(60) Provisional application No. 60/595,194, filed on Jun. 14, 2005.

(51) Int. Cl.
*H02J 1/10* (2006.01)
*H02J 3/38* (2006.01)
*H02J 9/00* (2006.01)
(52) U.S. Cl. .......................... 307/44; 307/64
(58) Field of Classification Search ............ 307/64, 307/44
See application file for complete search history.

(56) References Cited

U.S. PATENT DOCUMENTS

| | | | | |
|---|---|---|---|---|
| 5,446,645 A | * | 8/1995 | Shirahama et al. | 363/71 |
| 5,550,697 A | * | 8/1996 | Green et al. | 361/18 |
| 5,945,813 A | * | 8/1999 | Kondou et al. | 323/205 |
| 6,563,048 B2 | | 5/2003 | Holt | |
| 6,700,351 B2 | | 3/2004 | Blair | |
| 6,754,066 B2 | | 6/2004 | Doan | |
| 6,768,223 B2 | | 7/2004 | Powell | |
| 6,917,124 B2 | | 7/2005 | Shetler | |
| 7,132,951 B2 | | 11/2006 | Ziejewski | |
| 2007/0007825 A1 | | 1/2007 | Heber | |

* cited by examiner

*Primary Examiner*—Fritz M Fleming
*Assistant Examiner*—Dru M Parries
(74) *Attorney, Agent, or Firm*—Locke Lord Bissell & Liddell LLP

(57) ABSTRACT

An uninterruptible power supply (UPS) system includes a first UPS module that has a first power source, a second power source and a controller operable to selectively connect the first or second power source to a load. A second UPS module is connected in parallel with the first UPS module. The second UPS module also includes a first power source, a second power source and a controller operable to selectively connect the first or second power source to a load. The controller of the first UPS module gradually transfers power from the first power source of the first UPS module to the first power source of the second UPS module to detect the presence of the first power source of the second UPS module.

20 Claims, 1 Drawing Sheet

METHOD AND APPARATUS FOR MONITORING UPS POWER SOURCES

CROSS-REFERENCE TO RELATED APPLICATION

This application claims the benefit of U.S. Provisional Patent Application No. 60/595,194, filed on Jun. 16, 2005, which is incorporated by reference in its entirety.

BACKGROUND

The present invention relates generally to uninterruptible power supply (UPS) systems, and more particularly, to two or more UPS systems connected and operated in parallel.

A UPS system is used in applications that require continuity of power such that when the main power source fails, the UPS system provides power from a reserve energy storage system, typically in the form of a battery. The UPS system monitors the main power source and controls the UPS components to provide continuous power to the critical load.

To provide further continuity of power, multiple UPS modules may be paralleled with other UPS modules to form a redundant UPS system with a given multiplicity. This adds redundancy in that any UPS module may be disconnected from the critical load for service or automatically by the UPS to isolate a faulty module. The remaining module(s) still provide power to the critical load. Typically when UPS modules are paralleled, some module-to-module wiring is added to facilitate the sharing of power and the connection or disconnection of modules.

When a module needs be removed from the critical load, either manually for service or automatically due to a fault, it is vital that the module detect if at least one other module is able to support the critical load. If there is no other module(s) to support the critical load, then the module must transfer the critical load to its bypass source. Detecting the presence of redundant UPS modules could easily be done with the module-to-module wiring; however, this creates a dependency on that connection. It is thus desirable to detect the presence of other UPS modules using only local measurements.

Known systems detect the presence of other UPS modules using only local measurements by simply turning off or disconnecting the UPS source that becomes faulty and/or needs to be taken off line, then letting the UPS module monitor the output voltage. If the output voltage remains qualified, it can be assumed there are other UPS modules present supporting the load. If the output voltage becomes disqualified, then no other UPS module is present to support the load, and the UPS module may transfer the critical load to its bypass source. This approach however creates a large distortion or fluctuation on the output voltage when other modules are not present since depending on the load present, the effect of turning the source off or disconnecting it may be unpredictable.

The present application addresses these shortcomings associated with the prior art.

SUMMARY

This disclosure is concerned with uninterruptible power supply (UPS) devices and methods. An exemplary UPS module includes a first power source and a bypass source in the event the first power source fails. A controller exists that controls the UPS module. One of its functions is to transfer the source of power from the first to the second source and vice versa. To further add reliability multiple UPS modules may be connected in parallel.

In order to make the paralleled UPS system more reliable the controllers in each module rely only on their local measurements to determine if the other UPS module is capable of supporting the critical load. When a module needs to be taken off line for any reason, rather than simply turning the first power source off or disconnecting it, the first UPS module gradually transfers power from its first source to the first source of the second UPS module. If the second UPS module is capable of supporting the critical load, the voltage "signature" is "smooth", and the power gradually shifts to the second UPS module. If the second UPS module is not available to support the critical load, the first UPS module will detect a voltage fluctuation and the power will not shift to the second UPS module. The controller in the first UPS module will then "know" that it must transfer the critical load to its second source. Since the first UPS module gradually transfers the power to the other module in a controlled manner while still powering the load, the effect on the output voltage fluctuation can be minimized when no other modules are present.

BRIEF DESCRIPTION OF THE DRAWINGS

Other objects and advantages of the invention will become apparent upon reading the following detailed description and upon reference to the drawings in which.

Figure 1:
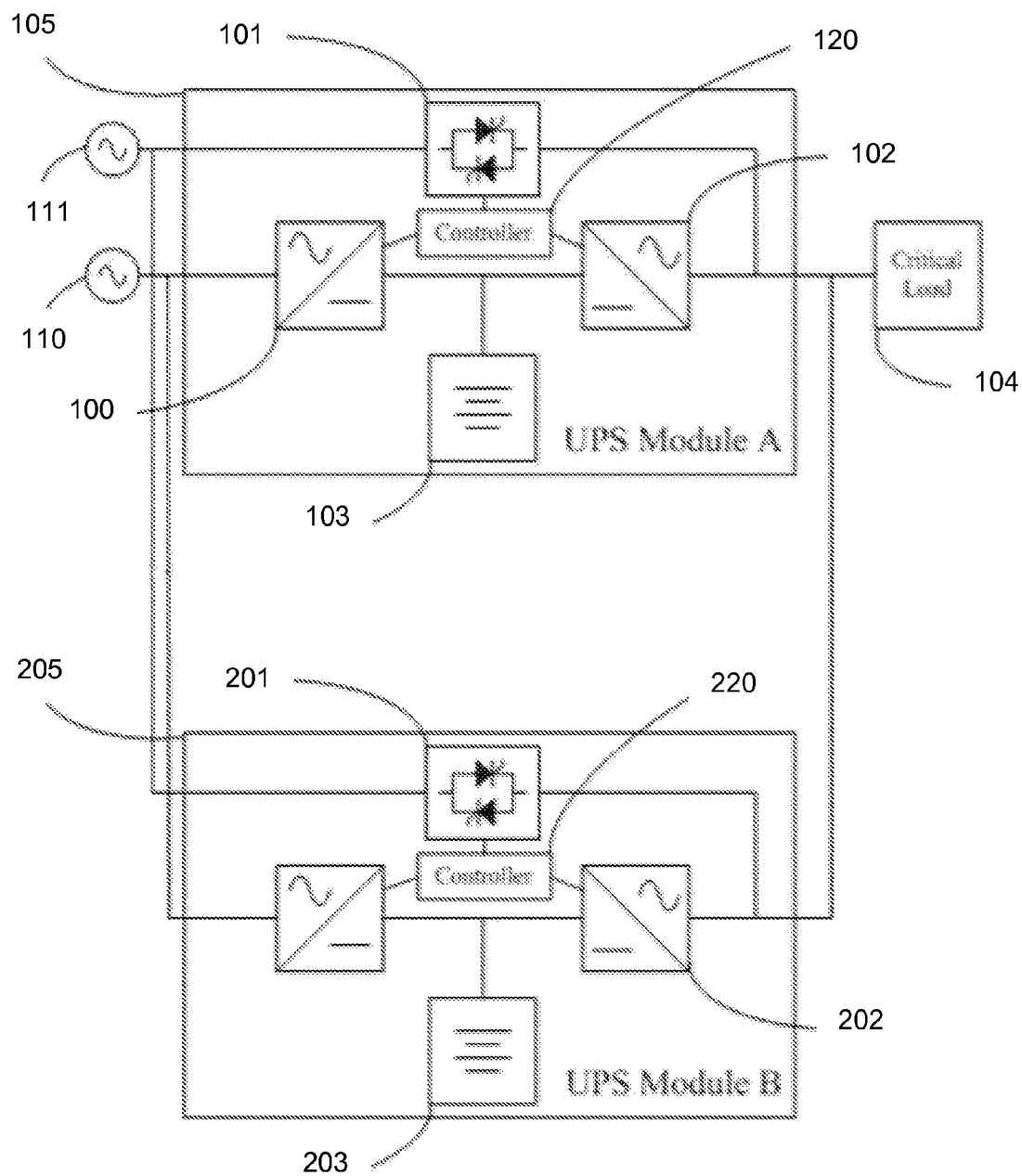
FIG. 1 is a block diagram schematically illustrating aspects of a paralleled UPS system.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

FIG. 1 illustrates aspects of an exemplary paralleled UPS system, including a first UPS module 105. The first UPS 105 includes a rectifier 100 that converts an AC power source 110 to DC power. The AC power source 110 may come from utility power or other AC power sources such as generators. A first power source 102, also referred to as an inverter, converts the DC power to a regulated conditioned AC power. A battery 103 provides reserve DC energy in the event there is a utility power outage. A bypass static switch 101 connects a secondary AC power source 111 to the load in the event the first power source 102 fails. The secondary power source 111 may optionally be connected to the same source as the AC power source 110 or it may come from a separate AC source. Devices suitable for the static switch 101 include SCRs, TRIAC, IGBT, etc. The UPS module 105 output is connected to a critical load 104. A controller 120 controls the operation of the entire module, including controlling the rectifier 103 operation, bypass static switch 101 activation/deactivation, and controlling the inverter 102 operation. The controller 120, may comprise, for example, a Digital Signal Processor (DSP) or any suitable programmable logic device.

Under normal conditions, the inverter or first power source 102, supplies power to the critical load. In the event that the first power source 102 fails, the controller 120 turns off the inverter 102 and turns on the bypass static switch 101 thus transferring the critical load 104 from the first power source 102 to the secondary power source 111, thereby maintaining power to the critical load 104.

To provide further redundancy and scalability, UPS modules such as the first UPS module 105 may be paralleled with additional UPS modules such as a second UPS module 205 shown in FIG. 1. The second UPS module 205 has the same subsystems as the UPS module 105, including a rectifier 200, a bypass static switch 201, a battery 203, a first power source (inverter) 202, and a controller 220. A plurality of UPS modules 105,205 may be connected in parallel, and the controller 120, 220 in each module is configured to operate in tandem with the other controller(s).

Being able to detect the presence of another "healthy" source when multiple UPS modules 105,205 are paralleled is necessary when determining whether to turn on the bypass static switch 101,201 or when it is time to let another UPS module provide power to the critical load. Suppose a need arises to take the first power source inverter 102 of UPS module 105 off line. In accordance with aspects of the teachings herein, control is adaptively modulated and the local measured power (real and reactive) is monitored. The controller 120 gradually sheds power from its inverter source 102 to a potential redundant power source, such as the first power source 202 of the second UPS Module 205. Then, by analyzing the power signature and the output voltage, the controller 120 can detect the presence of an alternate redundant source without the need for additional wiring. For example, if the first power source 202 of the second UPS module 205 is currently off line, the power signature will be essentially flat and the voltage will begin to deviate from nominal magnitude and frequency.

In an exemplary embodiment, the controller 120 gradually sheds the power from its first power source 102 by gradually changing the phase angle and/or amplitude of its output voltage. When other sources are present and are currently running in parallel with the inverter 102, changing the output voltage phase angle of the inverter 102 affects the amount of real power it delivers to the other sources, while changing the amplitude affects the amount of reactive power delivered to the other source. The amount of voltage phase angle and/or amplitude changes required in order to yield significant power flow changes from the inverter to the other sources are normally very small, in the order of a few electrical degrees for phase changes and less than 1% to 2% of the nominal amplitude for amplitude changes. If no other sources are currently present, changing the output voltage phase and amplitude will result in no significant power flow changes to and from the inverter.

As the controller 120 gradually changes the phase and amplitude of the voltage, it monitors the amount of power delivered by inverter 102. If no significant changes in the delivered power occur, the controller 120 then knows that no other modules are currently present. If the controller 120 detects power flow changes in accordance to the changes in the phase and/or amplitude, then it knows that there are other modules currently running in parallel with the inverter 120. Since the controller 120 changes the phase and/or amplitude by a very small amount, the output voltage remains essentially conditioned and regulated during the whole process, even when no other sources are present.

In another exemplary embodiment, the controller 120 gradually sheds the power from its first power source 102 by directly controlling the output current delivered by the inverter 102. In this case, the controller 120 essentially changes the operation mode of inverter 102 from acting as a voltage source—regulating the output voltage, to a current source—regulating the current. In this mode, the controller 120 needs to compute the instantaneous currents required to deliver given real and reactive power levels. One way to compute this is to perform the calculation in the DQ reference frame for the three-wire power system. The required instantaneous inverter currents $(i_d^*, i_q^*)$ in the DQ reference frame can be computed from $$i_q^* = \frac{v_q \cdot P + v_d \cdot Q}{v_q^2 + v_d^2} \rightarrow i_d^* = \frac{v_d \cdot P - v_q \cdot Q}{v_q^2 + v_d^2}$$

where P and Q denote the instantaneous real power and reactive power command to be delivered by the inverter, and $(v_d, v_q)$ are the actual inverter voltages in the DQ reference frame. The calculated inverter currents above are then used as references for the inverter current controller, which in turn forces the actual current to track these references. In this embodiment, at the beginning of the detection process, the current levels of real power P and reactive power Q delivered by the inverter are used as the power commands. These levels are then gradually decreased, while the controller monitors the actual power delivered and/or the output voltage fidelity. Unlike the first exemplary embodiment, in this embodiment, the controller 120 monitors the generated output voltage during this detection process. If the output voltage remains essentially "constant," then other sources must be present and currently running in parallel with the inverter 102. If no other sources are running in parallel, then the output voltage magnitude and frequency will start to deviate from their nominal values, since the load is now driven by the inverter 102 acting as a current source. Note that in this case, the voltage magnitude and frequency deviation will still be very small since the controller 120 starts the process by setting the power commands equal to the current power, and gradually decreases them by small amounts. The voltage magnitude deviation is detected by comparing the RMS voltage per phase using a fast sum-of-squares comparison as given by the following equation:

$$V_{mag}^2 = V_d^2 + V_q^2$$

where $V_d$ and $V_q$ are transformed $ABC_{In}$ voltages.

The frequency detection uses the output of a phase locked loop (PLL) that compares an instantaneous frequency (updated periodically, for example, every 326 µs) to a filter frequency. If the frequency difference is greater than some tuning constant or if the voltage magnitude is different than nominal by some tuning constant, then the controller 120 knows that there is no alternate source. If there is an alternate source, then the load is shifted to the other source and the output voltage stays at nominal frequency and magnitude. In an exemplary implementation, this is accomplished in about 83 milliseconds, depending on the load 104.

The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

What is claimed is:

1. A method for detecting the presence of a redundant power source, comprising:
    providing power to a load with a first power source of a first UPS module;
    gradually shedding power from the first power source while the first power source is healthy;
    monitoring the power output from the first power source to the load; and
    detecting the presence of a potential redundant power source in response to the output power monitoring.

2. The method of claim 1, wherein monitoring the power output to the load includes analyzing the power signature.

3. The method of claim 1, wherein monitoring the power output to the load includes analyzing the output voltage.

4. The method of claim 3, wherein analyzing the output voltage includes analyzing the output voltage magnitude.

5. The method of claim 3, wherein analyzing the output voltage includes a comparison of RMS voltage per phase to a predetermined value.

6. The method of claim 3, wherein analyzing the output voltage includes analyzing the output voltage frequency.

7. The method of claim 6, wherein analyzing the output voltage includes comparing the voltage frequency to a predetermined value.

8. The method of claim 1, wherein gradually shedding power includes changing the phase angle of an output of the first power source.

9. The method of claim 1, wherein gradually shedding power includes changing the amplitude of an output of the first power source.

10. The method of claim 1, wherein gradually shedding power includes controlling a current output of the first power source.

11. A method for detecting the presence of a potential redundant power source, comprising:
    providing power to a load with a first power source of a first UPS module;
    intentionally shedding power provided from the first power source of the first UPS module;
    monitoring the power output from the first power source to the load; and
    detecting the presence of the potential redundant power source in response to the power monitoring.

12. The method of claim 11, wherein detecting the presence of the potential redundant power source in response to the power monitoring relies on detecting differences in the power provided to the load from the first power source of the first UPS module.

13. The method of claim 11, wherein monitoring the power provided to the load includes analyzing the power signature.

14. The method of claims 11, wherein monitoring the power provided to the load includes analyzing the output voltage.

15. A method for detecting the presence of a potential redundant power source, comprising:
    providing power to a load with a first power source of a first UPS module;
    changing power provided from the first power source of the first UPS module;
    monitoring the power provided to the load from the first power source of the first UPS module;
    determining that the potential redundant power source is present by detecting changes in the power provided to the load from the first power source of the first UPS module; and
    determining that the potential redundant power source is not present by not detecting changes in the power provided to the load from the first power source of the first UPS module.

16. The method of claim 15, wherein monitoring the power provided to the load from the first power source includes analyzing the power signature.

17. The method of claims 15, wherein monitoring the power provided to the load from the first power source includes analyzing the output voltage.

18. The method of claim 15, wherein the power provided from the first power source is intentionally changed while the first power source is healthy and capable of supplying the power provided to the load.

19. The method of claim 15, wherein the presence of the redundant power source is thereby detected using only local measurements of the power provided to the load from the first power source.

20. The method of claim 15, wherein the presence of the redundant power source is thereby detected through the intentional introduction of changes to the power provided to the load from the first power source.

* * * * *